(12) United States Patent
Santhanam et al.

(10) Patent No.: US 12,460,145 B2
(45) Date of Patent: Nov. 4, 2025

(54) NATURAL GAS SWEETENING METHODS AND RELATED SYSTEMS

(71) Applicant: ExxonMobil Technology and Engineering Company, Spring, TX (US)

(72) Inventors: Priya Santhanam, Spring, TX (US); P. Scott Northrop, Spring, TX (US); Shwetha Ramkumar, Cypress, TX (US); John Timothy Cullinane, Montgomery, TX (US); Sean T. Philbrook, Houston, TX (US)

(73) Assignee: ExxonMobil Technology and Engineering Company, Spring, TX (US)

(*) Notice: Subject to any disclaimer, the term of this patent is extended or adjusted under 35 U.S.C. 154(b) by 364 days.

(21) Appl. No.: 18/300,166

(22) Filed: Apr. 13, 2023

(65) Prior Publication Data

US 2023/0347281 A1    Nov. 2, 2023

Related U.S. Application Data

(60) Provisional application No. 63/335,526, filed on Apr. 27, 2022.

(51) Int. Cl.
*B01D 53/14* (2006.01)
*C10L 3/10* (2006.01)
(Continued)

(52) U.S. Cl.
CPC .......... *C10L 3/101* (2013.01); *B01D 53/1406* (2013.01); *B01D 53/1462* (2013.01); *B01D 53/1487* (2013.01); *C10L 3/103* (2013.01); *C10L 3/104* (2013.01); *B01D 45/12* (2013.01); *B01D 53/26* (2013.01); *B01D 2252/103* (2013.01); *B01D 2252/20489* (2013.01); *B01D 2256/24* (2013.01); *B01D 2257/302* (2013.01); *B01D 2257/504* (2013.01);
(Continued)

(58) Field of Classification Search
None
See application file for complete search history.

(56) References Cited

U.S. PATENT DOCUMENTS

| | | | | |
|---|---|---|---|---|
| 2017/0157557 | A1* | 6/2017 | Ding | B01D 53/265 |
| 2020/0061523 | A1* | 2/2020 | Cullinane | B01D 53/1406 |
| 2021/0053827 | A1* | 2/2021 | Northrop | B01D 53/18 |

* cited by examiner

*Primary Examiner* — Gabriel E Gitman
(74) *Attorney, Agent, or Firm* — Vorys, Sater, Seymour and Pease LLP

(57) ABSTRACT

The present disclosure relates to methods and systems for sweetening natural gas may utilize a water wash to achieve a reduction in raw natural gas stream contaminants (e.g., particulate contaminants and/or chemical contaminants) and/or to recover solvent used for removing $H_2S$ and $CO_2$ from the natural gas. For example, a method may include contacting a first natural gas stream with a first water stream in a co-current contacting system to produce a second natural gas stream and a second water stream, wherein the first natural gas stream comprises natural gas, an acid gas, and a contaminate, and wherein a concentration of the contaminate in the second natural gas stream is less than a concentration of the contaminate in the first natural gas stream; and removing at least a portion of the acid gas from the second natural gas stream.

8 Claims, 12 Drawing Sheets

(51) Int. Cl.
*B01D 45/12* (2006.01)
*B01D 53/26* (2006.01)
(52) U.S. Cl.
CPC ................ *B01D 2257/7027* (2013.01); *B01D 2257/708* (2013.01); *C10L 2290/545* (2013.01)

NATURAL GAS SWEETENING METHODS AND RELATED SYSTEMS

FIELD OF INVENTION

The present disclosure relates to methods and systems for sweetening natural gas.

BACKGROUND

The production of hydrocarbons from a reservoir oftentimes carries with it the incidental production of non-hydrocarbon gases. Such gases include contaminants such as hydrogen sulfide ($H_2S$) and carbon dioxide ($CO_2$). When $H_2S$ or $CO_2$ are produced as part of a hydrocarbon gas stream, such as methane or ethane, the raw natural gas is sometimes referred to as a "sour" natural gas. The $H_2S$ and $CO_2$ are often referred to together as "acid gases."

Sour natural gas must be treated to remove the $H_2S$ and $CO_2$ before it can be used as an environmentally-acceptable fuel. As an example, for LNG, the $H_2S$ and $CO_2$ must be removed to very low levels (e.g., less than about 50 parts per million by volume (ppmv) $CO_2$ and less than about 4 ppmv $H_2S$). As another example, for pipeline gas, the $H_2S$ must be removed to a very low level (e.g., less than about 4 ppmv), while the $CO_2$ may be removed to a lesser extent.

For $CO_2$ and $H_2S$ removal, the hydrocarbon fluid stream may be treated with a solvent. Solvents may include chemical solvents such as amines. Examples of amines used in sour gas treatment include monoethanol amine (MEA), diethanol amine (DEA), and methyl diethanol amine (MDEA).

Physical solvents are sometimes used in lieu of amine solvents. Examples include SELEXOL® and RECTISOL™. In some instances, hybrid solvents, meaning mixtures of physical and chemical solvents, have been used. An example is SULFINOL®. In addition, the use of amine-based acid gas removal solvents is common.

Amine-based solvents rely on a chemical reaction with the acid gases. The reaction process is sometimes referred to as "gas sweetening." Such chemical reactions are generally more effective than the physical-based solvents, particularly at feed gas pressures below about 300 psia (2.07 MPa). There are instances where special chemical solvents such as FLEXSORB™ are used, particularly for selectively removing $H_2S$ from $CO_2$-containing gas streams.

As a result of the gas sweetening process, a treated or "sweetened" gas stream is created. The sweetened gas stream is substantially depleted of $H_2S$ and $CO_2$. The sweetened gas stream can be further processed for liquids recovery, that is, by condensing out heavier hydrocarbon gases. The sweetened gas stream may be sold into a pipeline or may be used for liquefied natural gas (LNG) feed if the concentrations of $H_2S$ and $CO_2$ are low enough. In addition, the sweetened gas stream may be used as feedstock for a gas-to-liquids process, and then ultimately used to make waxes, butanes, lubricants, glycols, or other petroleum-based products.

The removal of $H_2S$ and $CO_2$ from a natural gas stream produces a rich solvent including the $H_2S$ and $CO_2$. The rich solvent is sometimes referred to as an absorbent liquid. Following removal of the $H_2S$ and $CO_2$, a process of regeneration (also called "desorption") may be employed to separate the $H_2S$ and $CO_2$ from the active solvent of the absorbent liquid. This produces a lean solvent.

SUMMARY OF INVENTION

The present disclosure relates to methods and systems for sweetening natural gas. More specifically, the present application relates to methods and systems for sweetening natural gas that utilize a water wash to achieve a reduction in raw natural gas stream contaminants (e.g., particulate contaminants and/or chemical contaminants like methanol, benzene, toluene, ethyl benzene, xylene, and any combination thereof) and/or to recover solvent (e.g., MEA, DEA, MDEA, and any combination thereof) used for removing $H_2S$ and $CO_2$ from the natural gas.

A nonlimiting example method comprises: contacting a first natural gas stream with a first water stream in a co-current contacting system to produce a second natural gas stream and a second water stream, wherein the first natural gas stream comprises natural gas, an acid gas, and a contaminate, and wherein a concentration of the contaminate in the second natural gas stream is less than a concentration of the contaminate in the first natural gas stream; and removing at least a portion of the acid gas from the second natural gas stream.

Another nonlimiting example method comprises: removing at least a portion of an acid gas from a first natural gas stream using an amine solvent to produce a second natural gas stream, wherein a concentration of the acid gas in the second natural gas stream is less than a concentration of the acid gas in the first natural gas stream, and wherein the second natural gas stream comprises a portion of the amine solvent; and contacting the second natural gas stream with a first water stream in a co-current contacting system to produce a third natural gas stream and a second water stream, and wherein a concentration of the amine solvent in the third natural gas stream is less than a concentration of the amine solvent in the second natural gas stream.

Yet another nonlimiting example method comprises: removing at least a portion of an acid gas from a first natural gas stream using an amine solvent to produce a second natural gas stream, wherein a concentration of the acid gas in the second natural gas stream is less than a concentration of the acid gas in the first natural gas stream, and wherein the second natural gas stream comprises a portion of the amine solvent; contacting the second natural gas stream with a first water stream in a first portion of a demisting cyclone; and separating gas and liquid phases in a second portion of the demisting cyclone to produce a third natural gas stream and a second water stream, and wherein a concentration of the amine solvent in the third natural gas stream is less than a concentration of the amine solvent in the second natural gas stream.

These and other features and attributes of the disclosed methods and systems of the present disclosure and their advantageous applications and/or uses will be apparent from the detailed description which follows.

BRIEF DESCRIPTION OF THE DRAWINGS

To assist those of ordinary skill in the relevant art in making and using the subject matter hereof, reference is made to the appended drawings. The following figures are included to illustrate certain aspects of the disclosure, and should not be viewed as exclusive configurations. The subject matter disclosed is capable of considerable modifications, alterations, combinations, and equivalents in form and function, as will occur to those skilled in the art and having the benefit of this disclosure.

DETAILED DESCRIPTION

Figure 1:
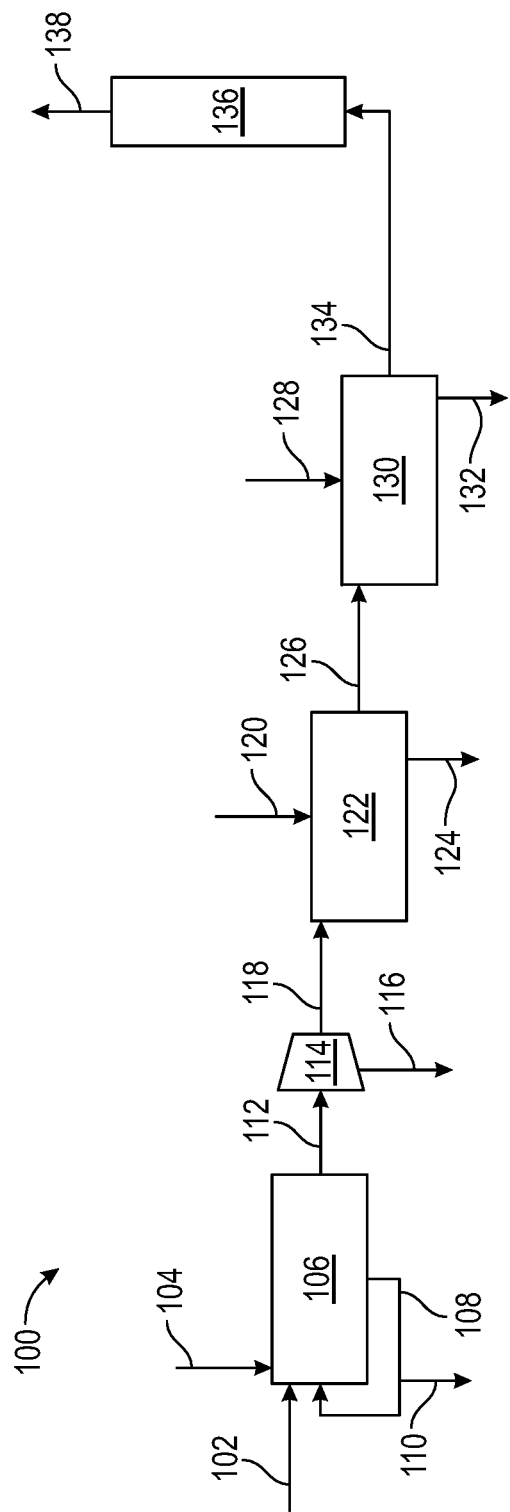
FIG. 1 is a flow diagram of a nonlimiting example system of the present disclosure that includes a co-current contacting system that uses water and is upstream of sour gas sweetening system.

To promote an understanding of the principles of the disclosure, reference will now be made to the features illustrated in the drawings and specific language will be used to describe the same. It will nevertheless be understood that no limitation of the scope of the disclosure is thereby intended. Any alterations and further modifications, and any further applications of the principles of the disclosure as described herein are contemplated as would normally occur to one skilled in the art to which the disclosure relates. For the sake of clarity, some features not relevant to the present disclosure may not be shown in the drawings.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

As one of ordinary skill would appreciate, different persons may refer to the same feature or component by different names. This document does not intend to distinguish between components or features that differ in name only. The figures are not necessarily to scale. Certain features and components herein may be shown exaggerated in scale or in schematic form and some details of conventional elements may not be shown in the interest of clarity and conciseness. When referring to the figures described herein, the same reference numerals may be referenced in multiple figures for the sake of simplicity. In the following description and in the claims, the terms "including" and "comprising" are used in an open-ended fashion, and thus, should be interpreted to mean "including, but not limited to."

The articles "the," "a" and "an" are not necessarily limited to mean only one, but rather are inclusive and open ended so as to include, optionally, multiple such elements.

As used herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numeral ranges provided. Accordingly, these terms should be interpreted as indicating that insubstantial or inconsequential modifications or alterations of the subject matter described and are considered to be within the scope of the disclosure.

"Exemplary" is used exclusively herein to mean "serving as an example, instance, or illustration." Any embodiment or aspect described herein as "exemplary" is not to be construed as preferred or advantageous over other embodiments.

"Acid gas" refers to any gas that produces an acidic solution when dissolved in water. Nonlimiting examples of acid gases include hydrogen sulfide ($H_2S$), carbon dioxide ($CO_2$), sulfur dioxide ($SO_2$), carbon disulfide ($CS_2$), carbonyl sulfide (COS), mercaptans, or mixtures thereof.

"Co-current contactor" refers to a vessel that receives a gas stream and a separate solvent stream in such a manner that the gas stream and the solvent stream contact one another while flowing in generally the same direction.

The term "co-currently" refers to the internal arrangement of process streams within a unit operation that can be divided into several sub-sections by which the process streams flow in the same direction.

As used herein, a "column" is a separation vessel in which a counter-current flow is used to isolate materials on the basis of differing properties.

The term "gas" is used interchangeably with "vapor," and is defined as a substance or mixture of substances in the gaseous state as distinguished from the liquid or solid state. Likewise, the term "liquid" means a substance or mixture of substances in the liquid state as distinguished from the gas or solid state.

A "hydrocarbon" is an organic compound that primarily includes the elements hydrogen and carbon, although nitrogen, sulfur, oxygen, metals, or any number of other elements can be present in small amounts. As used herein, hydrocarbons generally refer to components found in natural gas, oil, or chemical processing facilities.

Methods and Systems for Sweetening Natural Gas

The present disclosure relates to methods and systems for sweetening natural gas. More specifically, the present application relates to methods and systems for sweetening natural gas that utilize a water wash to achieve a reduction in raw natural gas stream contaminants (e.g., particulate contaminants and/or chemical contaminants like methanol, benzene, toluene, ethyl benzene, xylene, and any combination thereof) and/or to recover solvent (e.g., MEA, DEA, MDEA, and any combination thereof) used for removing $H_2S$ and $CO_2$ from the natural gas.

The present application includes methods and systems for sweetening natural gas that utilize a water wash (a) to achieve a reduction in raw natural gas stream contaminants and/or (b) to recover solvent used for removing $H_2S$ and $CO_2$ from the natural gas.

When used for reducing contaminants in a natural gas stream, the systems and methods may use a co-current contacting system upstream of a sour gas sweetening system. Said co-current contacting system may use water as an absorbent for contaminants like methanol, benzene, toluene, ethyl benzene, xylene, the like, and any combination thereof and/or a dispersant for particulate contaminates like corrosion products, iron sulfide, sand, soot (e.g., from combustion products), the like, and any combination thereof. Said sour gas sweetening systems may be systems that use amine absorbents to reduce the amount of $H_2S$ and/or $CO_2$ in the natural gas. Said sour gas sweetening systems may comprise co-current contacting systems and/or counter-current contactors. Advantageously, removing reducing contaminants in a natural gas stream upstream of sweetening may reduce foaming in the sweetening system, improve production capacity, reduce fouling of components in the sweetening system, reduce physical damage to components of the sweetening system caused by particulate matter, and/or slow the degradation of solvent used in the sweetening system.

FIG. 1 is a flow diagram of a nonlimiting example system 100 of the present disclosure. The system includes a co-current contacting system 106 that is fed with a natural gas stream 102 and a water stream 104. The co-current contacting system 106 causes the water and natural gas to contact and allows the water to absorb and/or dissolve and/or disperse contaminants) (e.g., particulate contaminants and/or chemical contaminants) from the natural gas. The rich water stream 108 (e.g., water having absorbed and/or dissolved and/or dispersed contaminants therein) is separated from the natural gas stream 112 in the co-current contacting system 106. The rich water stream 108 may optionally be recycled back as at least a portion of the water used for removing contaminants from the natural gas. A purge line 110 may be included in the recycle loop for the rich water stream 108 to reduce the amount of liquid flowing back in the recycle loop, for example, when the concentration of contaminants is sufficiently high in the rich water stream 108. In such cases, makeup water may be added using the water stream 104.

The amount of chemical contaminants (e.g., methanol, benzene, toluene, ethyl benzene, and xylene contaminants, cumulatively) may be reduced by 25 ppm or greater (or about 25 ppm to about 250 ppm, or about 25 ppm to about 100 ppm, or about 50 ppm to about 150 ppm, or about 100 ppm to about 200 ppm, or about 150 ppm to about 250 ppm) when comparing the outlet natural gas stream 112 composition and the inlet natural gas stream 102 composition.

The amount of particulate contaminants (e.g., corrosion products, iron sulfide, sand, and soot contaminants, cumulatively) may be reduced by about 10 wt % or more (or about 10 wt % to 100 wt %, or about 10 wt % to about 40 wt %, or about 25 wt % to about 75 wt %, or about 50 wt % to about 80 wt %, or about 60 wt % to 100 wt %) when comparing a total weight of particulate contaminants in the outlet natural gas stream 112 composition and a total weight of particulate contaminants in the inlet natural gas stream 102 composition.

The co-current contacting system 106 may be operated at a liquid-to-gas ratio of about 100 gallons/million standard cubic feet (gal/MMscf) to about 2000 gal/MMscf (or about 100 gal/MMscf to about 1000 gal/MMscf, or about 500 gal/MMscf to about 1500 gal/MMscf, or about 1000 gal/MMscf to about 2000 gal/MMscf).

The co-current contacting system 106 may be operated at a temperature (where contacting of the liquid and gas begins) of about 50° F. to about 160° F. (or about 80° F. to about 130° F.).

The natural gas stream 112 is then transported to a sour gas sweetening system. In the illustrated system 100, the sour gas sweetening system includes two co-current contacting systems 122 and 130. Sour gas sweetening systems that comprise one or more co-current contacting systems are described in U.S. Pat. Nos. 10,130,897, 10,155,193, 10,343,107, and 11,000,797, each of which is incorporated herein by reference.

In the illustrated system 100, an optional compressor 114 is included between the co-current contacting system 106 and the sour gas sweetening system. The compressor 114 may compress the natural gas stream 112 and cause water entrained in the natural gas stream 112 to condense and be partially removed. This produces a water stream 116 and a compressed natural gas stream 118. Alternative, or in addition, to the compressor 114 other apparatuses or systems (e.g., a filter coalescing vessel) may be used to purify the natural gas stream 112. Said other apparatuses or systems may or may not also include components to compress the natural gas stream 112.

The compressed natural gas stream 118 may then be sweetened by contacting the compressed natural gas stream 118 and a first lean amine solvent stream 120 in a second co-current contacting system 122. The second co-current contacting system 122 causes the lean amine solvent and natural gas to contact and allows the lean amine solvent to remove acid gas (e.g., $H_2S$ and/or $CO_2$) from the gas phase. Produced is a first rich solvent stream 124 and a first sweetened natural gas stream 126.

The first sweetened natural gas stream 126 may have a reduced concentration of the $H_2S$ and/or the $CO_2$ as compared to the compressed natural gas stream 118. For example, the compressed natural gas stream 118 may comprise about 100 ppm to about 10 mol % (or about 100 ppm to about 2 mol %, or about 2000 ppm to about 5 mol %, or about 1 mol % to about 6 mol %, or about 4 mol % to about 10 mol %) $H_2S$ and/or about 1 mol % to about 10 mol % (or about 1 mol % to about 6 mol %, or about 4 mol % to about 10 mol %) $CO_2$, along with the natural gas. The first sweetened natural gas stream 126 may comprise about 10 ppm to about 8 mol % (or about 0.1 mol % to about 3 mol %, or about 0.5 mol % to about 5 mol %, or about 2 mol % to about 8 mol %) $H_2S$ and/or about 0.1 mol % to about 8 mol % (or about 0.1 mol % to about 3 mol %, or about 0.5 mol % to about 5 mol %, or about 2 mol % to about 8 mol %) $CO_2$, along with the natural gas.

Examples of liquid amines useful in the first lean amine solvent stream 120 may include, but are not limited to, MEA, DEA, MDEA, the like, and any combination thereof.

The first rich solvent stream 124 may be collected for regeneration, recycled back to the second co-current contacting system 122, or a portion collected for regeneration and a portion recycled back to the second co-current contacting system 122.

The first sweetened natural gas stream 126 may be similarly treated in a third co-current contacting system 130 with a second lean amine solvent stream 128 to remove additional acid gas from the first sweetened natural gas stream 126 and produce a second rich solvent stream 132 and a sweetened natural gas stream 134. The disclosure of the components, operating conditions, lean amine solvent stream composition relative to the second co-current contacting system 122 apply to the third co-current contacting system 130.

The sweetened natural gas stream 134 may comprise about 5 mol % or less (or about 1 ppm to about 5 mol %, or about 1 ppm to about 100 ppm, or about 10 ppm to about 1000 ppm, or about 0.001 mol % to about 0.1 mol %, or about 0.01 mol % to about 1 mol %, or about 0.1 mol % to about 5 mol %) $H_2S$ and/or about 5 mol % or less (or about 0.001 mol % to about 5 mol %, or about 0.001 mol % to about 0.1 mol %, or about 0.01 mol % to about 1 mol %, or about 0.1 mol % to about 5 mol %) $CO_2$, along with the natural gas.

The sweetened natural gas stream 134 may then be flowed through a demisting cyclone 136 (or other comparable apparatus or system) to remove liquid droplets from the sweetened natural gas stream 134 and produce a sweet natural gas stream 138.

While FIG. 1 illustrates only two co-current contacting systems in the sour gas sweetening portion of the system, the systems and methods described herein may include any number of co-current contacting systems, for example, one to ten or more. Further, recycling of rich solvent stream may be to the co-current contacting system that produces the rich solvent stream or another co-current contacting system or both.

Figure 2:
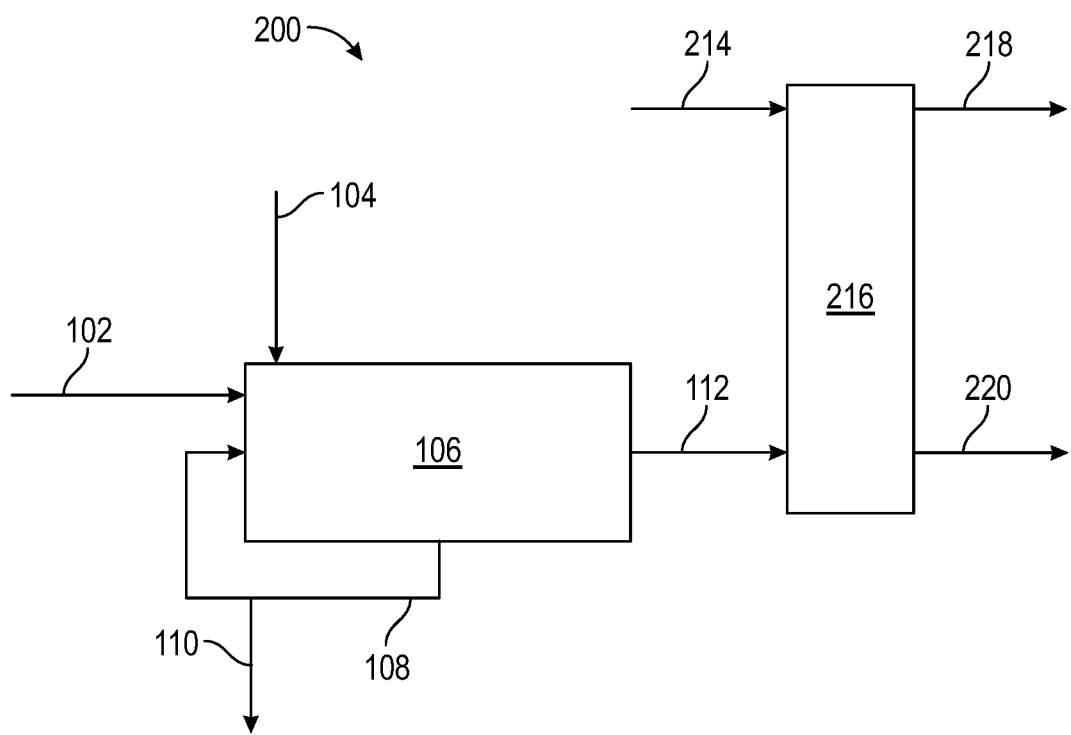
FIG. 2 is a flow diagram of another nonlimiting example system of the present disclosure that includes a co-current contacting system that uses water and is upstream of sour gas sweetening system.

FIG. 2 is a flow diagram of a nonlimiting example system 200 of the present disclosure. As with FIG. 1, the system includes a co-current contacting system 106 that is fed with a natural gas stream 102 and a water stream 104. The same reference numbers used in FIG. 2 indicates the disclosure relative to FIG. 1 apply similarly to the system 200. While not illustrated in FIG. 2, the compressor pump 114 may be included in the system 200 between the co-current contacting system 106 and the sour gas sweetening system.

In the illustrated sour gas sweetening system is a countercurrent sour gas sweetening system. In the illustrated system 200, the natural gas stream 112 may then be sweetened by contacting in a countercurrent configuration (e.g., using column 216) the natural gas stream 112 and a lean amine solvent stream 214 to produce a sweet natural gas stream 218 and a rich solvent stream 220.

When used for recovering solvent used for removing $H_2S$ and $CO_2$ from the natural gas, the systems and methods may use a contacting system downstream of a sour gas sweetening system. The sour gas sweetening system may use an amine solvent for removing $H_2S$ and $CO_2$ from the natural gas. Said downstream contacting system may use water as an absorbent for amine solvent that passes through the sour gas sweetening system. Said downstream contacting system may comprise co-current contacting systems and/or countercurrent contactors. Because the amine solvent is typically expensive, the downstream contacting system may capture additional solvent and reduce costs for the sour gas sweetening system overall.

Figure 3:
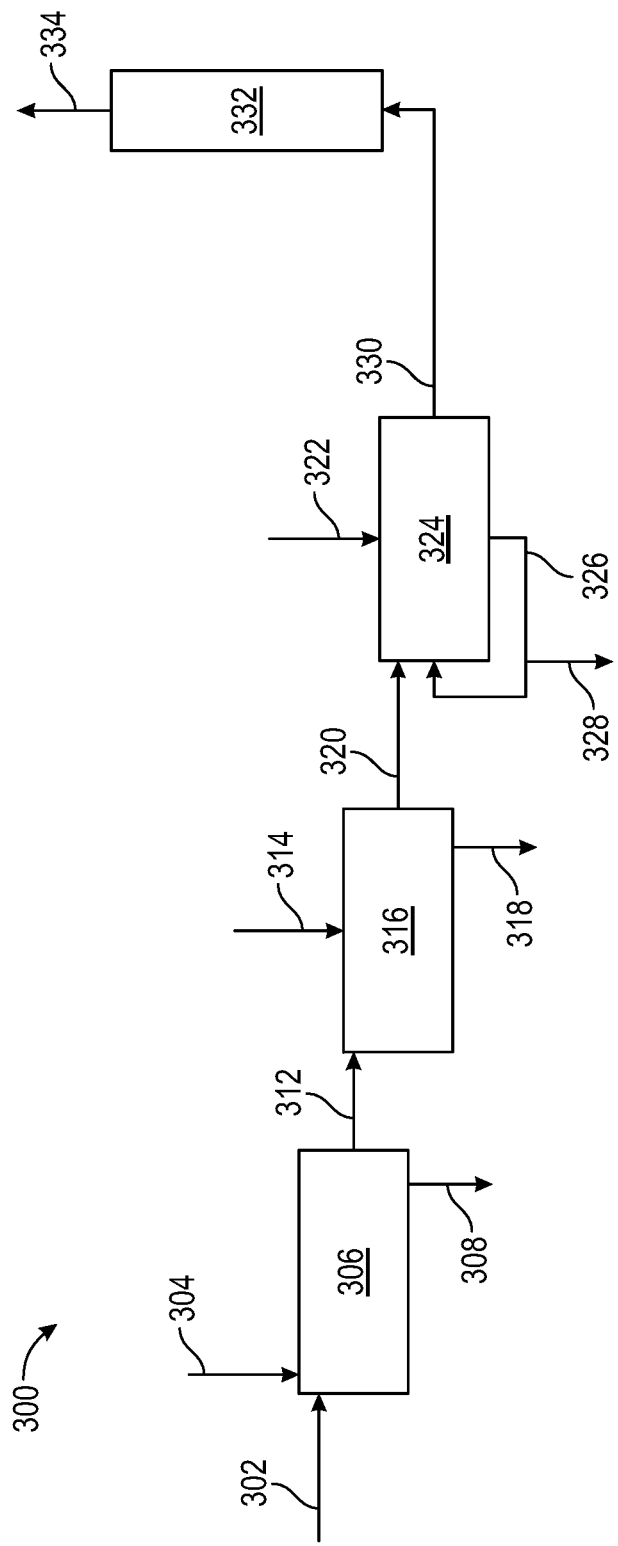
FIG. 3 is a flow diagram of a nonlimiting example system of the present disclosure that includes a co-current contacting system that uses water and is downstream of sour gas sweetening system.

FIG. 3 is a flow diagram of a nonlimiting example system 300 of the present disclosure. The system includes a sour gas sweetening system. The illustrated sour gas sweetening system comprise two co-current contacting systems 306 and 316. A natural gas stream 302 and a first lean amine solvent stream 304 are contacted in the first co-current contacting system 306 to produce a first rich amine solvent stream 308 and a first sweetened natural gas stream 312. The first rich amine solvent stream 308 may optionally be recycled back as feed for the first co-current contacting system 306 and/or removed from the system (e.g., for regeneration). When recycling occurs, the flow of the first lean amine solvent stream 304 may be reduced.

The first sweetened natural gas stream 312 may then be flowed to the second co-current contacting system 316 where said stream 312 is contacted with a second lean amine solvent stream 314 to produce a second rich amine solvent stream 318 and a second sweetened natural gas stream 320. Similar to the first co-current contacting system 306, the second rich amine solvent stream 318 may be recycled back to the second co-current contacting system 316 and/or purged (purge line not illustrated).

The sour gas sweetening system illustrated in FIG. 3 is a nonlimiting example, the number of co-current contacting system, the configuration of recycling lines, and the conditions of co-current contacting may be varied as needed. For example, the second rich amine solvent stream may be recycled, at least in part, back to the first co-current contacting system. In another example, the number of co-current contacting systems may be 1 to 10 as needed for reducing the concentration of the acid gases to desired levels. In another example, the temperature of one or more of the co-current contacting steps may be at a reduced temperature to facilitate preferential removal of $H_2S$ over $CO_2$. Again, sour gas sweetening systems that comprise one or more co-current contacting systems are described in U.S. Pat. Nos. 10,130,897, 10,155,193, 10,343,107, and 11,000,797, each of which is incorporated herein by reference.

The second sweetened natural gas stream 320 may have amine solvent entrained therein. To remove said amine solvent, the second sweetened natural gas stream 320 may be contacted with a water stream 322 in a third co-current contacting system 324 to produce a rich water stream 326 and a third sweetened natural gas stream 330. To remove water entrained in the third sweetened natural gas stream 330, the third sweetened natural gas stream 330 may be treated in a demisting cyclone 332 to yield a sweetened natural gas product stream 334.

The rich water stream 326 may be recycled back to the third co-current contacting system 324 to remove amine solvent from additional second sweetened natural gas stream 320. A purge line 328 may be used for extracting at least a portion of the rich water stream 326. The amine solvent often uses water makeup, so the use of water to recover more amine solvent may improve water balance and amine recovery. Further, water from the demisting cyclone may be recycled back to the third co-current contacting system 324.

Figure 4:
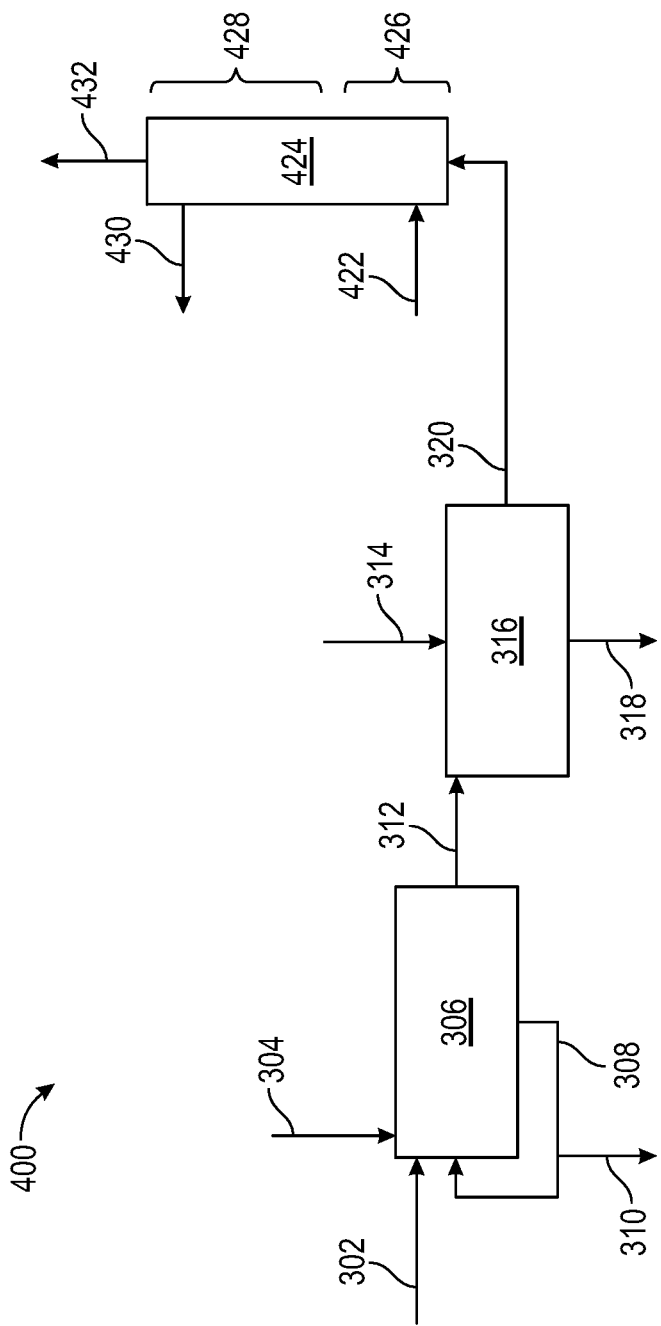
FIG. 4 is a flow diagram of a nonlimiting example system of the present disclosure that includes a countercurrent contacting system that uses water and is downstream of sour gas sweetening system.

FIG. 4 is a flow diagram of a nonlimiting example system 400 of the present disclosure. The system includes a sour gas sweetening system as illustrated in FIG. 3 where the disclosure for the same reference numbers applies to FIG. 4. The second sweetened natural gas stream 320 from the second co-current contacting system 316 may be fed to a demisting cyclone 424 that has a first section 426 that comprises one or more nozzles for introducing a water stream 422 into the demisting cyclone 424. The water contacts the second sweetened natural gas stream 320 and absorbs the amine solvent entrained therein. In a second portion 428 of the demisting cyclone 424, gas and liquid phases are separated. That is, water is removed from the fluids in the demisting cyclone 424 to produce a rich water stream 430 and a sweetened natural gas product stream 432. The rich water stream 430 may be treated as described relative to the rich water stream 326 of FIG. 3.

FIGS. 1-4 illustrate nonlimiting example systems. One skilled in the art would recognize that additional components may be included in said systems including, but not limited to, any suitable types of heaters, chillers, condensers, liquid pumps, gas compressors, filters, blowers, bypass lines, or other types of separation and/or fractionation equipment, valves, switches, controllers, pressure-measuring devices, temperature-measuring devices, level-measuring devices, or flow-measuring devices, among others.

Further, hybrid systems are contemplated that incorporate an upstream co-current contacting system (e.g., co-current contacting system 106 of FIG. 1 or FIG. 2) and incorporate a downstream contacting system (e.g., third co-current contacting system 324 of FIG. 3 or the demisting cyclone 424 of FIG. 4).

Co-Current Contacting System

Figure 5:
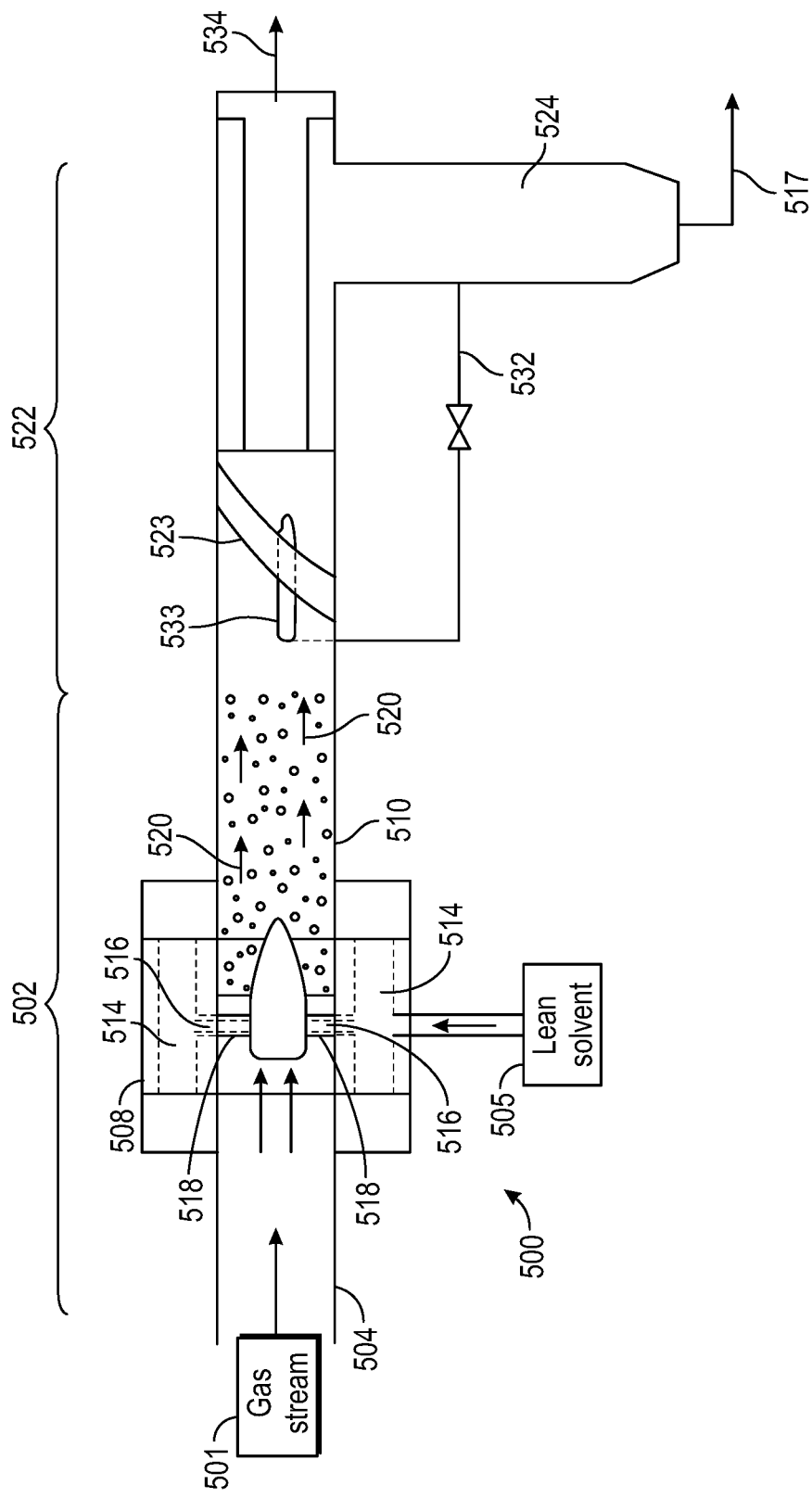
FIG. 5 is a side elevational view of a co-current contacting system according to disclosed aspects.

FIG. 5 illustrates the co-current contacting system 500 in further detail. The co-current contacting system 500 can provide for the separation of components within a gas stream 501, such as a natural gas stream. The co-current contacting system 500 can include a co-current contactor 502 that is positioned in-line within a pipe 504. The co-current contactor 502 may include a number of components that provide for the efficient contacting of a liquid droplet stream, such as a lean liquid stream 505 (e.g., water stream 104 of FIG. 1 or 2, lean amine solvent streams 120 and 128 of FIG. 1, or lean amine solvent streams 304 and 314 or water stream 322 of FIG. 3), with a flowing gas stream, such as natural gas stream, for the separation of chemical and/or particulate contaminants from the natural gas stream and/or for the separation of amine solvent from the natural gas stream.

The co-current contactor 502 may include a droplet generator 508 and a mass transfer section 510. As shown in FIG. 5, the gas stream 501 may be flowed through the pipe 504 and into the droplet generator 508. The lean liquid stream 505 may also be flowed into the droplet generator 508, for example, through a hollow space 514 coupled to flow channels 516 in the droplet generator 508.

From the flow channels 516, the lean liquid stream 505 is released into the gas stream 501 as fine droplets through injection orifices 518, and is then flowed into the mass transfer section 510. This can result in the generation of a treated gas stream 520 within the mass transfer section 510. The treated gas stream 520 may include small liquid droplets dispersed in a gas phase. For example, in $H_2S$ separation processes, the liquid droplets may include $H_2S$ molecules from the natural gas stream that are absorbed or dissolved into the lean liquid stream 505. For example, in amine solvent removal processes, the liquid droplets may include amine solvent that was previously entrained with a natural gas stream and is now absorbed or dissolved into the lean liquid stream 505.

The treated gas stream 520 may be flowed from the mass transfer section 510 to a separation system 522, which includes a cyclonic separator 523 and a collector 524. Alternatively the separation system may include a mesh screen, or a settling vessel. Preferably, in-line cyclonic separators may be used to realize the benefits of compactness and reduced diameter. The cyclonic separator 523 removes the liquid droplets from the gas phase. The liquid droplets, which as previously stated may include chemical and/or particulate contaminants and/or amine solvent absorbed or dissolved or dispersed in the lean liquid stream 505, are diverted into collector 524, which directs the collected liquids as a rich liquid stream 517 (e.g., the rich water stream 108 of FIG. 1 or 2, rich solvent streams 124 and 132 of FIG. 1, or rich solvent streams 308 and 318 or rich water stream 326 of FIG. 3) to further processing. A pressure equalization line 532 may extend from the collector 524 and operates to allow gas in the collector to return to the separation system 522. In an aspect, this gas flows via a nozzle 533 or eductor situated inside the separation system 522. A processed gas stream 534, from which the (a) chemical and/or particulate contaminants and/or amine solvent and (b) rich solvent has been separated, exits the separation system 522 in an in-line orientation with the pipe 504.

Figure 6A:
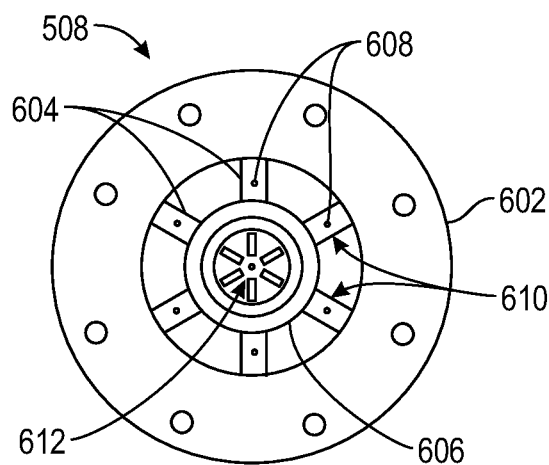
FIGS. 6A-6D are side elevational views and perspective views of droplet generators according to disclosed aspects.

FIG. 6A is a front view of droplet generator 508 according to disclosed aspects. The droplet generator 508 is a contacting device that may be implemented within a co-current contactor, for example, in the co-current contactor 502 described with respect to the co-current contacting system 500 of FIG. 5. The front view of the droplet generator 508 represents an upstream view of the droplet generator.

The droplet generator 508 may include an outer annular support ring 602, a number of spokes 604 extending from the annular support ring 602, and a gas entry cone 606. The annular support ring 602 may secure the droplet generator 508 in-line within the pipe. In addition, the spokes 604 may provide support for the gas entry cone 606.

The annular support ring 602 may be designed as a flanged connection, or as a removable or fixed sleeve inside the pipe. In addition, the annular support ring 602 may include a liquid feed system and a hollow channel described further with respect to FIGS. 6C and 6D. A liquid stream, such as a lean liquid stream 505, may be fed to the droplet generator 508 via the hollow channel in the annular support ring 602. The lean liquid stream 505 may comprise a solvent such as Flexsorb/SE and/or water. The hollow channel may allow equal distribution of the liquid stream along the perimeter of the droplet generator 508.

Small liquid channels within the annular support ring 602 may provide a flow path for the lean liquid stream to flow through liquid injection orifices 608 within the spokes 604. The liquid injection orifices 608 may be located on or near the leading edge of each spoke 604. Placement of the liquid injection orifices 608 on the spokes 604 may allow the lean liquid stream to be uniformly distributed in a gas stream that is directed between the spokes 604. Specifically, the lean liquid stream may be contacted by the portion of the gas stream 501 flowing through the gaps between the spokes 604, and can be sheared into small droplets and entrained in the gas phase.

A portion of the gas stream flows between the spokes to the mass transfer section while the remainder of the gas stream flows into the gas entry cone 606 through a gas inlet 612. The gas entry cone 606 may block a cross-sectional portion of the pipe. The spokes 604 include gas exit slots 610 that allow the gas stream to be flowed out of the gas entry cone 606. This may increase the velocity of the gas stream as it flows through the pipe. The gas entry cone 606 may direct a predetermined amount of the gas stream to the gas exit slots 610 on the spokes 604.

Some of the lean liquid stream injected through the spokes 604 may be deposited on the surface of the spokes 604 as a liquid film. As the gas stream flows through the gas entry cone 606 and is directed out of the gas exit slots 610 on the spokes 604, the gas stream may sweep, or blow, much of the liquid film off the surface of the spokes 604. This may enhance the dispersion of the lean liquid stream into the gas phase. Further, the obstruction to the flow of the gas stream and the shearing effect created by the exit of the gas stream gas through the gas exit slots may provide a zone with an increased turbulent dissipation rate. This may result in the generation of smaller droplets that enhance the mass transfer rate between the lean liquid stream and the gas stream.

The dimensions of various components of the droplet generator 508 may be varied such that the gas stream flows at a high velocity. This may be accomplished via either a sudden reduction in the diameter of the annular support ring 602 or a gradual reduction in the diameter of the annular support ring 602. The outer wall of the droplet generator 508 may be slightly converging in shape, terminating at the point where the gas stream and the lean liquid stream are discharged into the downstream pipe. This can allow for the shearing and re-entrainment of any solvent film that is removed from the droplet generator 508. Further, a radial inward ring, grooved surface, or other suitable equipment may be included on the outer diameter of the droplet generator 508 near the point where the gas stream and the lean liquid stream are discharged into the downstream pipe. This may enhance the degree of liquid entrainment within the gas phase.

The downstream end of the droplet generator 508 may discharge into a section of pipe (not shown). The section of pipe can be a straight section of pipe, or a concentrically expanding section of pipe. The gas entry cone 606 may terminate with a blunt ended cone or a tapered ended cone. In other aspects, the gas entry cone 606 can terminate with a ridged cone, which can include multiple concentric ridges along the cone that provide multiple locations for droplet generation. In addition, any number of gas exit slots 610 may be provided on the cone itself to allow for the removal of solvent film from the droplet generator 508.

Figure 6B:
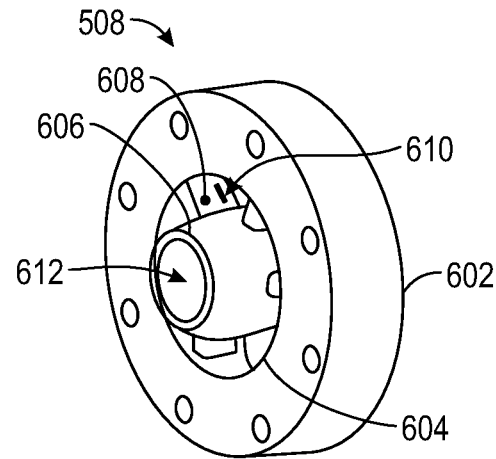

FIG. 6B is a side perspective view of the droplet generator 508. Like numbered items are as described with respect to FIG. 6A. As shown in FIG. 6B, the upstream portion of the gas entry cone 606 may extend further into the pipe than the annular support ring 602 and the spokes 604 in the upstream direction. The downstream portion of the gas entry cone 606 can also extend further into the pipe than the annular support ring 602 and the spokes 604 in the downstream direction. The length of the gas entry cone 606 in the downstream direction depends on the type of cone at the end of the gas entry cone 606, as described further with respect to FIGS. 6C and 6D.

Figure 6C:
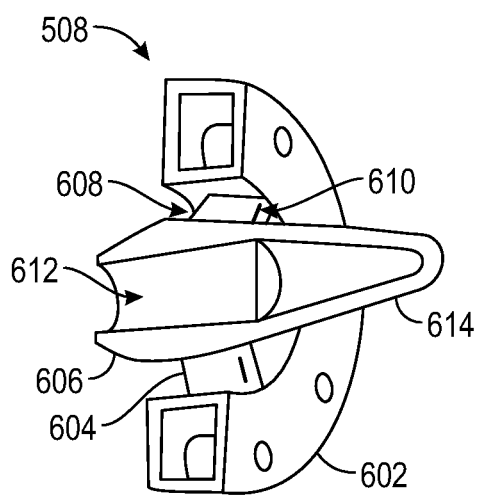

FIG. 6C is a cross-sectional side perspective view of the droplet generator 508 according to a disclosed aspect. Like numbered items are as described with respect to FIGS. 6A and 6B. According to FIG. 6C, the gas entry cone 606 of the droplet generator 508 terminates with a tapered ended cone 614. Terminating the gas entry cone 606 with a tapered ended cone 614 may reduce the overall pressure drop in the pipe caused by the droplet generator 508.

Figure 6D:
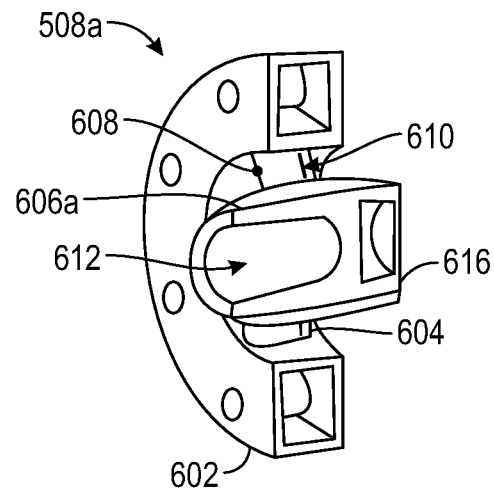

FIG. 6D is a cross-sectional side perspective view of the droplet generator 508a according to another disclosed aspect. Like numbered items are as described with respect to FIGS. 6A-6C. According to FIG. 6D, the gas entry cone 606a of the droplet generator 508a terminates with a blunt ended cone 616. Terminating the gas entry cone 606a with a blunt ended cone 616 may encourage droplet formation in the center of the pipe.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the incarnations of the present inventions. At the very least, and not as an attempt to limit the application of the doctrine of equivalents to the scope of the claim, each numerical parameter should at least be construed in light of the number of reported significant digits and by applying ordinary rounding techniques.

One or more illustrative incarnations incorporating one or more invention elements are presented herein. Not all features of a physical implementation are described or shown in this application for the sake of clarity. It is understood that in the development of a physical embodiment incorporating one or more elements of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

ADDITIONAL EMBODIMENTS

Embodiment 1. A method comprising: contacting a first natural gas stream with a first water stream in a co-current contacting system to produce a second natural gas stream and a second water stream, wherein the first natural gas stream comprises natural gas, an acid gas, and a contaminate, and wherein a concentration of the contaminate in the second natural gas stream is less than a concentration of the contaminate in the first natural gas stream; and removing at least a portion of the acid gas from the second natural gas stream.

Embodiment 2. The method of Embodiment 1, wherein the contaminant comprises a chemical contaminant including one or more of: methanol, benzene, toluene, ethyl benzene, or xylene.

Embodiment 3. The method of any of Embodiments 1-2, wherein the contaminant comprises a particulate contaminant.

Embodiment 4. The method of any of Embodiments 1-3 further comprising: recycling at least a portion of the second water stream back to the co-current contacting system.

Embodiment 5. The method of any of Embodiments 1-4 further comprising: compressing the second natural gas stream before the removing of the at least a portion of the acid gas therefrom.

Embodiment 6. The method of any of Embodiments 1-5, wherein the removing of the at least a portion of the acid gas from the second natural gas stream comprises: contacting the second natural gas stream with a lean amine solvent stream in a second co-current contacting system.

Embodiment 7. The method of any of Embodiments 1-6, wherein the removing of the at least a portion of the acid gas from the second natural gas stream comprises: contacting the second natural gas stream with a lean amine solvent stream in a countercurrent contacting system.

Embodiment 8. The method of any of Embodiments 1-7, wherein removing at least a portion of the acid gas from the second natural gas stream produces a third natural gas stream, and wherein the method further comprises: contacting the third natural gas stream with a third water stream in a second co-current contacting system to produce a fourth natural gas stream and a fourth water stream, and wherein a concentration of an amine solvent in the fourth natural gas stream is less than a concentration of the amine solvent in the third natural gas stream.

Embodiment 9. The method of any of Embodiments 1-8, wherein the co-current contacting system is configured to: co-currently flow the first natural gas stream and a first water stream through the co-current contactor; and incorporate liquid droplets formed from the first water stream into the first natural gas stream, such that the contaminants from the first natural gas stream are absorbed or dissolved or dispersed by the liquid droplets; and a separator configured to collect the liquid droplets to form the second water stream and the second natural gas stream.

Embodiment 10. A method comprising: removing at least a portion of an acid gas from a first natural gas stream using an amine solvent to produce a second natural gas stream, wherein a concentration of the acid gas in the second natural gas stream is less than a concentration of the acid gas in the first natural gas stream, and wherein the second natural gas stream comprises a portion of the amine solvent; and contacting the second natural gas stream with a first water stream in a co-current contacting system to produce a third natural gas stream and a second water stream, and wherein a concentration of the amine solvent in the third natural gas stream is less than a concentration of the amine solvent in the second natural gas stream.

Embodiment 11. The method of Embodiment 10 further comprising: contacting the second water stream with the second natural gas stream.

Embodiment 12. The method of any of Embodiments 10-11, wherein the co-current contacting system is configured to: co-currently flow the second natural gas stream and a first water stream through the co-current contactor; and incorporate liquid droplets formed from the first water stream into the second natural gas stream, such that the amine solvent from the second natural gas stream are absorbed or dissolved or dispersed by the liquid droplets; and a separator configured to collect the liquid droplets to form the second water stream and the third natural gas stream.

Embodiment 13. A method comprising: removing at least a portion of an acid gas from a first natural gas stream using an amine solvent to produce a second natural gas stream, wherein a concentration of the acid gas in the second natural gas stream is less than a concentration of the acid gas in the first natural gas stream, and wherein the second natural gas stream comprises a portion of the amine solvent; contacting the second natural gas stream with a first water stream in a first portion of a demisting cyclone; and separating gas and liquid phases in a second portion of the demisting cyclone to produce a third natural gas stream and a second water stream, and wherein a concentration of the amine solvent in the third natural gas stream is less than a concentration of the amine solvent in the second natural gas stream.

Embodiment 14. The method of Embodiment 13 further comprising: contacting the second water stream with the second natural gas stream.

To facilitate a better understanding of the embodiments of the present invention, the following examples of preferred or representative embodiments are given. In no way should the following examples be read to limit, or to define, the scope of the invention.

EXAMPLES

Example 1. A co-current contacting system according to FIGS. 5-6D was used for contacting a natural gas feed stream with a water stream with produce a decontaminated natural gas stream. The flow or feed rates of the natural gas feed stream and the water stream were varied. Additionally, for a first portion the experiments, fresh water was used as the water stream while recycled water was used for a second portion of the experiments.

The concentration of contaminants was measured for the natural gas feed stream and the decontaminated natural gas stream. Specifically, methanol and BTEX (benzene, toluene, ethyl benzene, and xylene) were separately analyzed.

Figure 7:
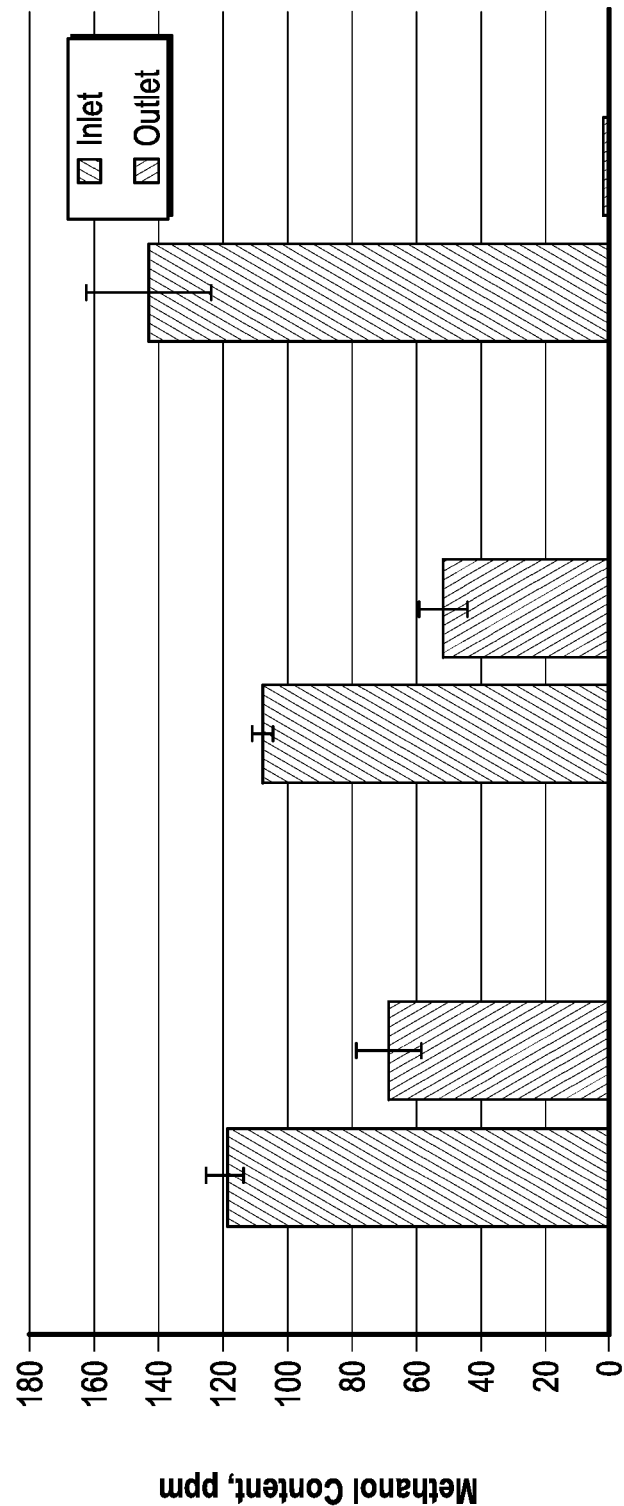
FIG. 7 is a graph of the inlet and outlet concentrations of methanol for three water wash in co-current contactor experiments.
Figure 8:
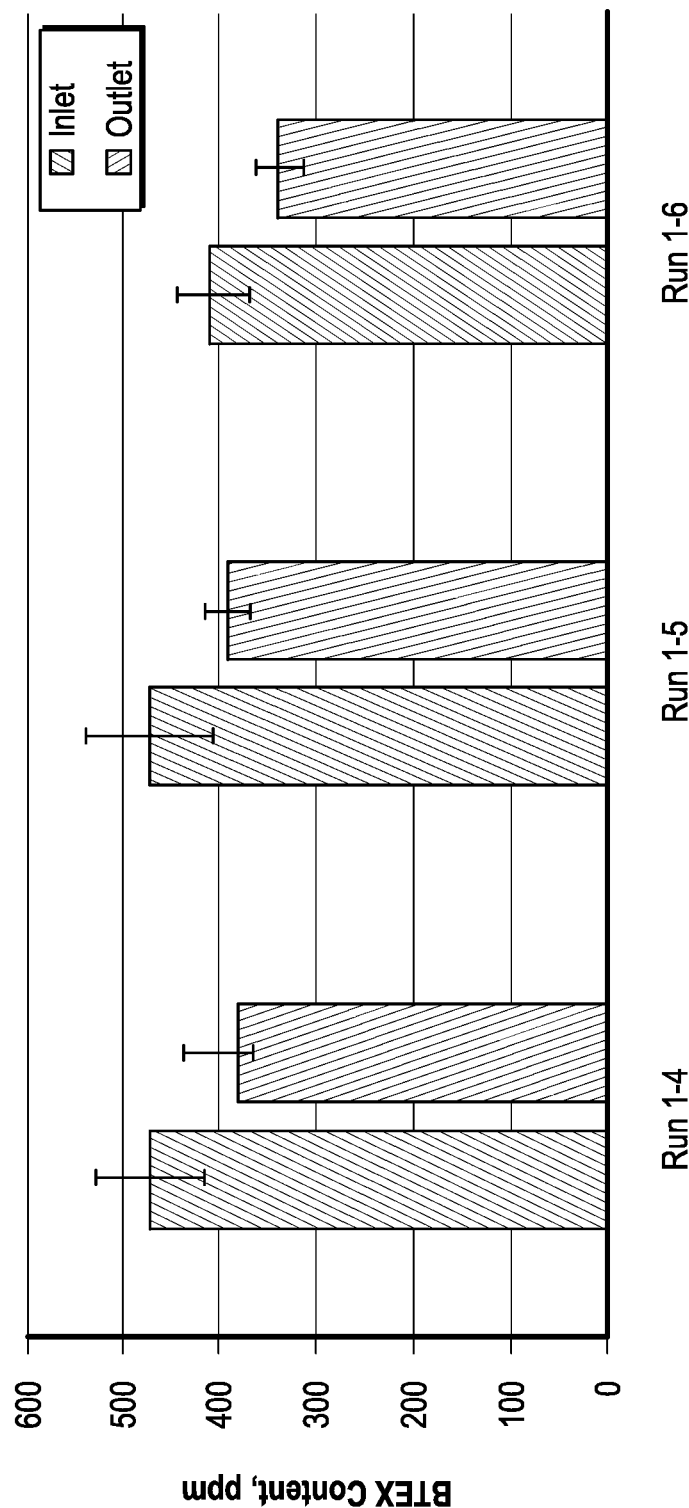
FIG. 8 is a graph of the inlet and outlet concentrations of BTEX (benzene, toluene, ethyl benzene, and xylene) for three water wash in co-current contactor experiments.
Figure 9:
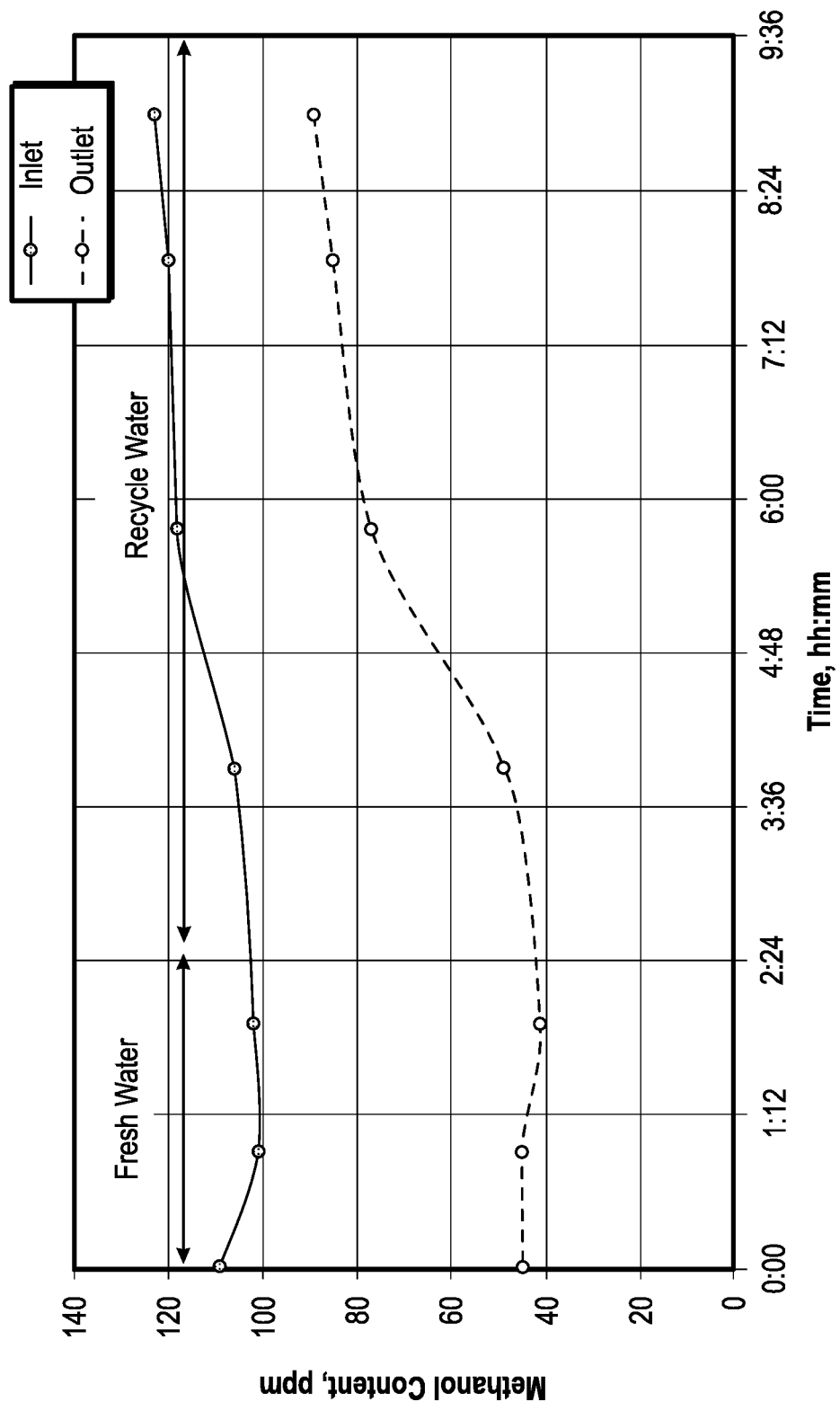
FIGS. 9 and 10 are plots of methanol and BTEX concentration, respectively, for Runs 1-2 and 1-5 from FIGS. 7 and 8, respectively.
Figure 10:
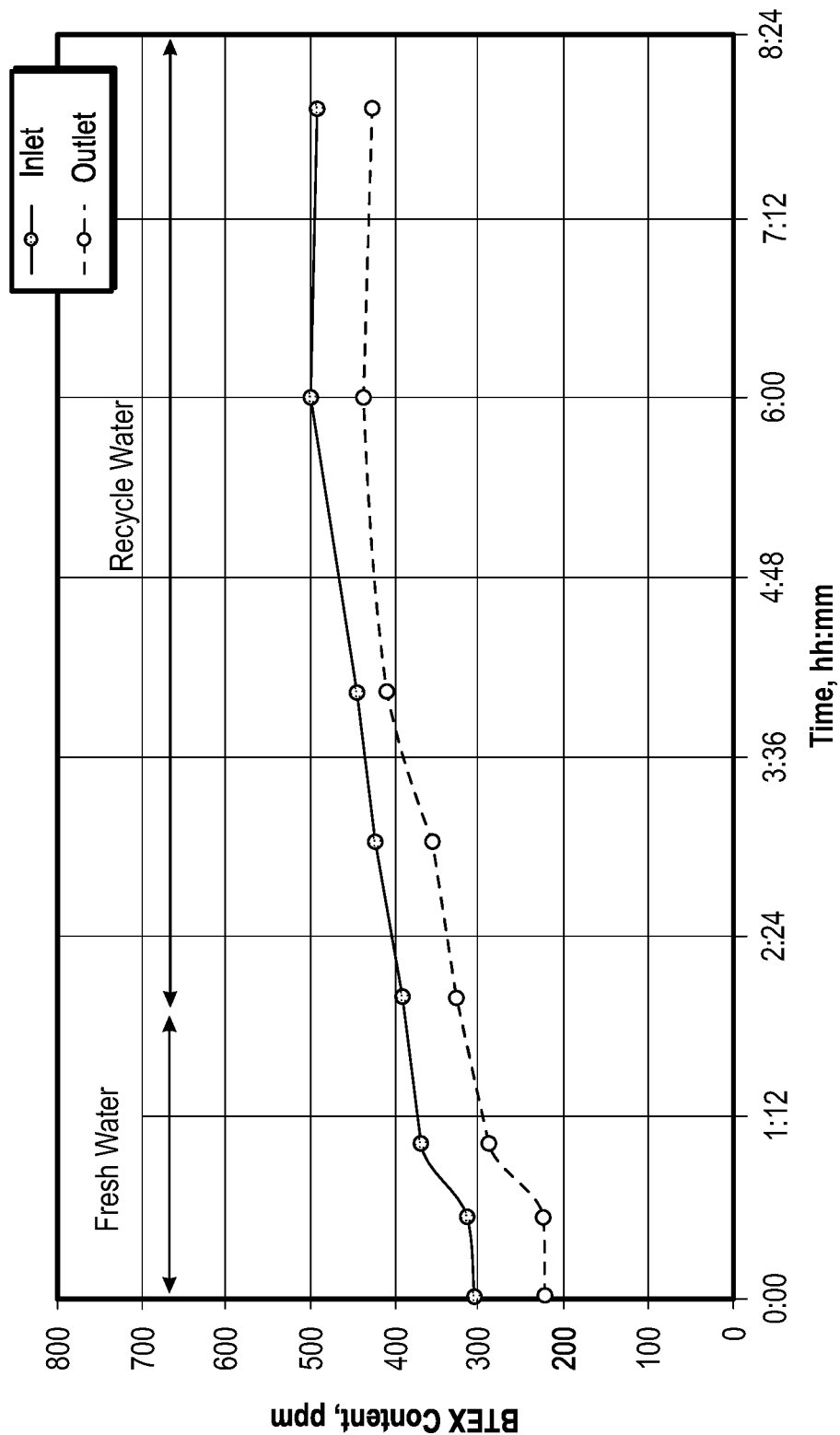

Tables 1 and 2 provide the flow conditions for runs 1-1 to 1-6. The inlet and outlet concentrations of methanol and BTEX were monitored for Runs 1-1 to 1-3 and Runs 1-4 to 1-6, respectively, and are plotted in FIGS. 7 and 8, respectively. FIGS. 9 and 10 provide a plot of methanol and BTEX concentration, respectively, for Runs 1-2 and 1-5.

TABLE 1

| Run Number | Water Flow Rate (GPM) | Natural Gas Flow Rate (MMscfd) |
| --- | --- | --- |
| 1-1 | 2 | 15 |
| 1-2 | 2 | 2 |
| 1-3 | 5 | 15 |
| 1-4 | 2 | 15 |
| 1-5 | 2 | 2 |
| 1-6 | 5 | 15 |

This example illustrates that water may be used in a co-current contacting system to reduce the concentration of methanol and BTEX in a natural gas feed.

Example 2. A co-current contacting system according to FIGS. 5-6D was used for contacting a natural gas feed stream with a water stream where said natural gas stream came from a sour gas sweetening system and comprised amine solvent. The overall system was similar to FIG. 3. MDEA was used as the amine solvent.

Figure 11:
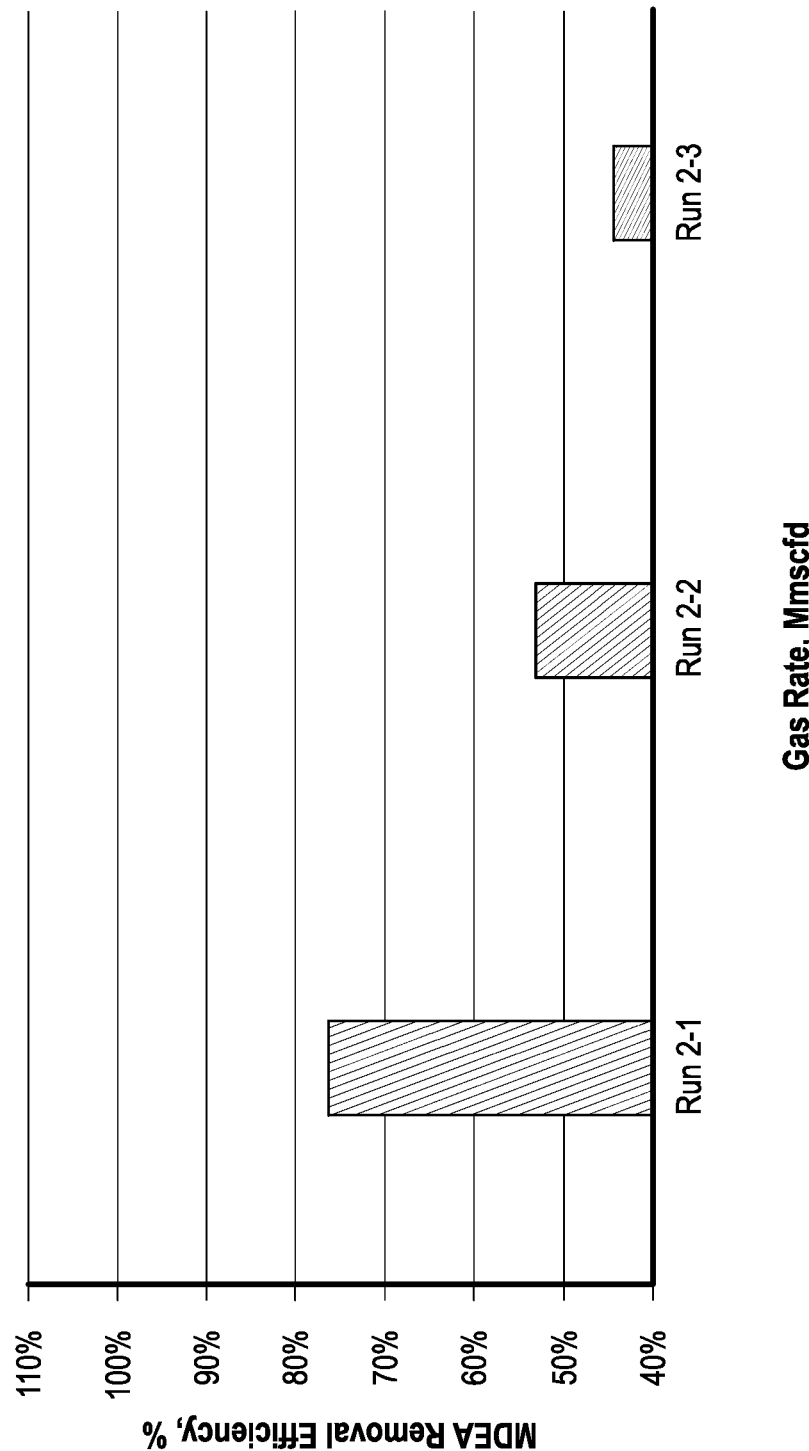
FIG. 11 plots the MDEA removal efficiency for three water wash in co-current contactor experiments.
Figure 12:
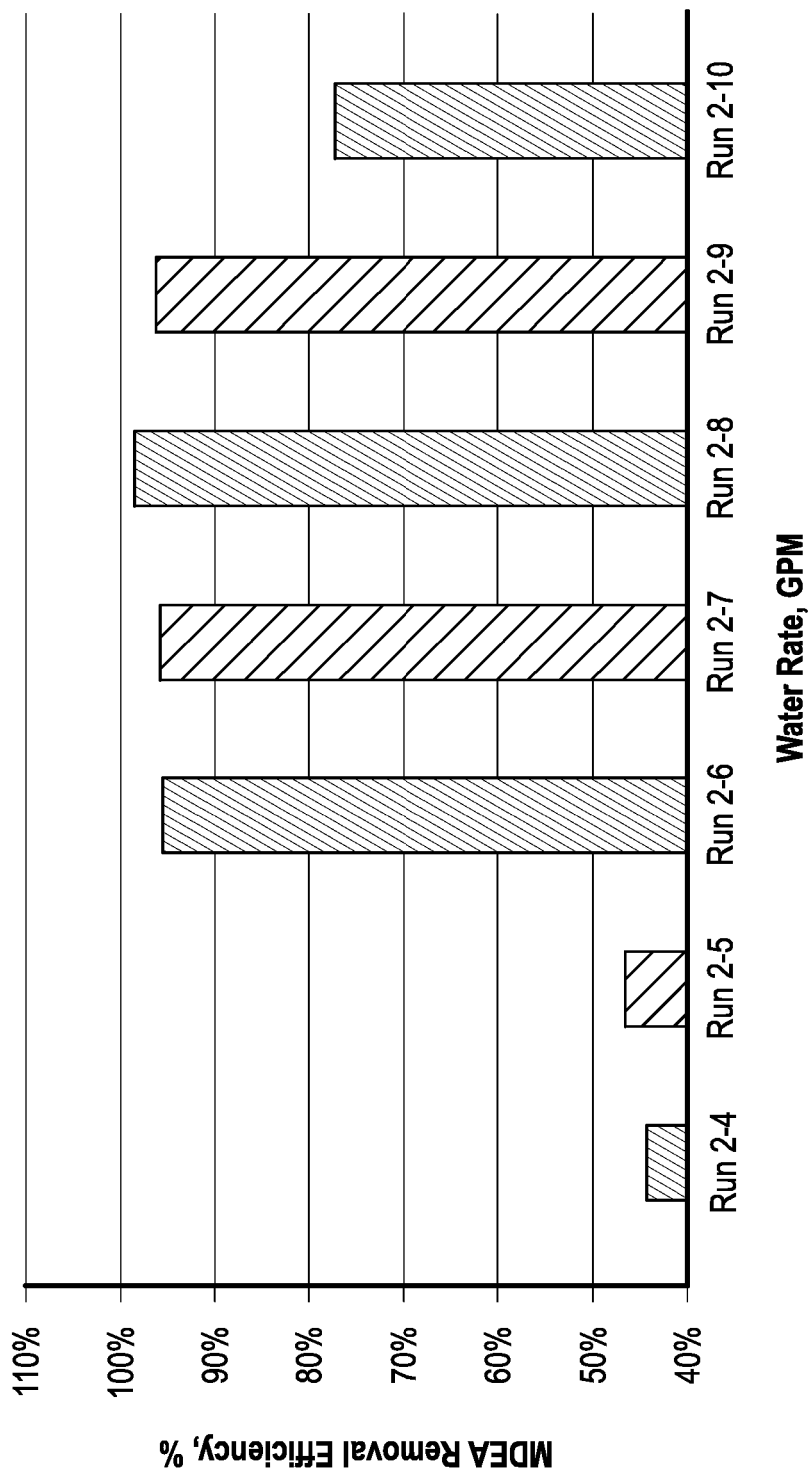
FIG. 12 plots the MDEA removal efficiencies for seven water wash in co-current contactor experiment.

In Runs 2-1 to 2-3, 10 GPM of MDEA was flowed through each of two co-current contacting systems in series. The third co-current contacting system flowed 2 GPM of water. FIG. 11 provides the MDEA removal efficiency for 5 MMscfd natural gas flow (Run 2-1), 10 MMscfd natural gas flow (Run 2-2), and 15 MMscfd natural gas flow (Run 2-3). MDEA removal efficiency is calculated as the measured MDEA content in the rich MDEA stream (e.g., stream 326 of FIG. 3) divided by the expected MDEA content times 100. The expected MDEA content is calculated based on estimated carryover for a given set of gas and liquid rates (basis: instrumentation).

In Runs 2-4 to 2-10, the MDEA flow rate was changed in the first co-current contacting system, and the water flow rate was changed in the third co-current contacting system. The natural gas flow rate was 15 MMscfd. The flow rates are provide in Table 2, and the MDEA removal efficiencies are provide in FIG. 11.

TABLE 2

| Run Number | MDEA Flow Rate (GPM) | Water Flow Rate (GPM) |
| --- | --- | --- |
| 2-4 | 10 | 2.5 |
| 2-5 | 3.5 | 2.5 |
| 2-6 | 10 | 3.5 |
| 2-7 | 3.5 | 3.5 |
| 2-8 | 10 | 5 |
| 2-9 | 3.5 | 5 |
| 2-10 | 10 | 7 |

This example illustrates that water may be used in a co-current contacting system to extract amine solvent.

Therefore, the present invention is well adapted to attain the ends and advantages mentioned as well as those that are inherent therein. The particular examples and configurations disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
    contacting a first natural gas stream with a first water stream in a co-current contacting system to produce a second natural gas stream and a second water stream, wherein the first natural gas stream comprises natural gas, an acid gas, and a contaminant, and wherein a concentration of the contaminant in the second natural gas stream is less than a concentration of the contaminant in the first natural gas stream;
    removing at least a portion of the acid gas from the second natural gas stream, to produce a third natural gas stream; and
    contacting the third natural gas stream with a third water stream in a second co-current contacting system to produce a fourth natural gas stream and a fourth water stream, wherein a concentration of an amine solvent in the fourth natural gas stream is less than a concentration of the amine solvent in the third natural gas stream.

2. The method of claim 1, wherein the contaminant comprises a chemical contaminant including one or more of: methanol, benzene, toluene, ethyl benzene, or xylene.

3. The method of claim 1, wherein the contaminant comprises a particulate contaminant.

4. The method of claim 1 further comprising:
    recycling at least a portion of the second water stream back to the co-current contacting system.

5. The method of claim 1 further comprising:
    compressing the second natural gas stream before the removing of the at least a portion of the acid gas therefrom.

6. The method of claim 1, wherein the removing of the at least a portion of the acid gas from the second natural gas stream comprises:
    contacting the second natural gas stream with a lean amine solvent stream in a third co-current contacting system.

7. The method of claim 1, wherein the removing of the at least a portion of the acid gas from the second natural gas stream comprises:
    contacting the second natural gas stream with a lean amine solvent stream in a countercurrent contacting system.

8. The method of claim 1, wherein the co-current contacting system is configured to: co-currently flow the first natural gas stream and the first water stream through the co-current contactor; and incorporate liquid droplets formed from the first water stream into the first natural gas stream, such that the contaminants from the first natural gas stream are absorbed or dissolved or dispersed by the liquid droplets; and wherein the co-current contacting system further comprises a separator configured to collect the liquid droplets to form the second water stream and the second natural gas stream.

* * * * *